United States Patent [19]

Borras

[11] Patent Number: 4,918,431

[45] Date of Patent: Apr. 17, 1990

[54] METHOD AND APPARATUS FOR AUTOMATICALLY ADJUSTING THE OUTPUT POWER OF A TRANSMITTER

[75] Inventor: Jaime A. Borras, Hialeah, Fla.

[73] Assignee: Motorola, Inc., Schaumburg, Ill.

[21] Appl. No.: 264,387

[22] Filed: Oct. 31, 1988

[51] Int. Cl.$^4$ .......................... H04Q 7/00; H04B 9/00
[52] U.S. Cl. .................................. 340/825.44; 455/92; 455/107; 340/825.310
[58] Field of Search ....................... 455/10, 33, 34, 52, 455/54, 56, 79, 80, 89, 101, 127, 343, 92, 95, 134, 76, 603; 379/58, 59, 60, 63; 340/825.06, 825.49, 825.44, 825.31

[56] References Cited

U.S. PATENT DOCUMENTS

| | | |
|---|---|---|
| 3,898,390 | 8/1975 | Wells et al. |
| 3,906,166 | 9/1975 | Cooper et al. |
| 4,254,504 | 3/1981 | Lewis et al. .......................... 455/76 |
| 4,291,411 | 9/1981 | Müller et al. ....................... 455/603 |
| 4,556,760 | 12/1985 | Goldman. |
| 4,593,409 | 6/1986 | Miller .................................. 455/343 |
| 4,696,027 | 9/1987 | Bonta ................................... 379/60 |
| 4,777,653 | 10/1988 | Bonnerot et al. .................... 455/69 |
| 4,794,649 | 12/1988 | Fujiwara .......................... 340/825.44 |

FOREIGN PATENT DOCUMENTS 0236521 11/1985 Japan ..................................... 455/92

Primary Examiner—Donald J. Yusko
Assistant Examiner—Dervis Magistre
Attorney, Agent, or Firm—Thomas G. Berry

[57] ABSTRACT

A transceiver must pass through a predetermined area and receive two codes before relocating from a low power to a high power communication system (and vise versa). By determining in which order the two codes were received, the transceiver knows whether it has advanced from a low-to-high or high-to-low power communication system. Accordingly, the transceiver may adjust its transmitter power or other operational parameters to properly operate in both communication system. Also, the transceiver operates to approximate remaining battery life when it determines that it is moving from a low power to a high power mode. In this way, the transceiver may inform an operator of limited operational life in a high power mode, while the individual has an opportunity to obtain additional or a replacement battery.

18 Claims, 4 Drawing Sheets

METHOD AND APPARATUS FOR AUTOMATICALLY ADJUSTING THE OUTPUT POWER OF A TRANSMITTER

TECHNICAL FIELD

This invention relates generally to radio frequency (RF) communication systems, and more specifically to systems utilizing variable power RF transceivers, and is particularly directed toward automatically adjusting the output power of transceivers operating in a local area or "On-Site" communication system and a higher power "Off-Site" RF communication system.

BACKGROUND ART

Numerous techniques exist to vary the power of a transmitter or transceiver operating within a communication system. For example, in a Cellular communication system, individual transceivers may be instructed by a repeater unit to increase or decrease their transmitter power. Thus, upon receipt of an appropriate command code, the Cellular transceiver adjusts its transmitter power (up or down) by a predetermined amount.

Generally, local area communication systems, commonly referred to as "On-Site" systems, operate as low power communication systems that facilitate communication within a building or other small geographic area (site). By employing low power transmitters, "On-Site" transceivers enjoy a longer battery life, and may be made physically smaller and lighter than their high power transceiver counterparts.

As a practical matter however, individuals will, from time to time, temporarily leave a building or facility, and thus leave the effective communication range of the "On-Site" system. Therefore, in order to remain in communication with others at the "On-Site" facility, it becomes necessary to carry both a high power "Off-Site" transceiver and a low power "On-Site" transceiver. Thus, any individual having occasion to leave the facility must manage two radios, which may prove to be both inconvenient and costly.

SUMMARY OF THE INVENTION

Accordingly, it is an object of the present invention to provide a transceiver capable of adjusting its transmitter power so as to be operable in both a low power and a high power communication system.

Briefly, according to the invention, a transceiver must pass through a predetermined area and receive two codes before relocating from a lower power to a high power communication system (and vise versa). By determining in which order the two codes were received, the transceiver knows whether it has advanced from a low power to a high power communication system or from a high power to low power communication system. Accordingly, the transceiver may adjust its transmitter power or other operational parameters to properly operate in both communication systems.

In another aspect of the present invention, the transceiver operates to determine the remaining battery life when it detects that it is moving from a low power to a high power mode. In this way, the transceiver may inform an operator of limited operational life in the high power mode, while the operator has an opportunity to obtain additional or replacement batteries.

DETAILED DESCRIPTION OF THE PREFERRED EMBODIMENT

Figure 1:
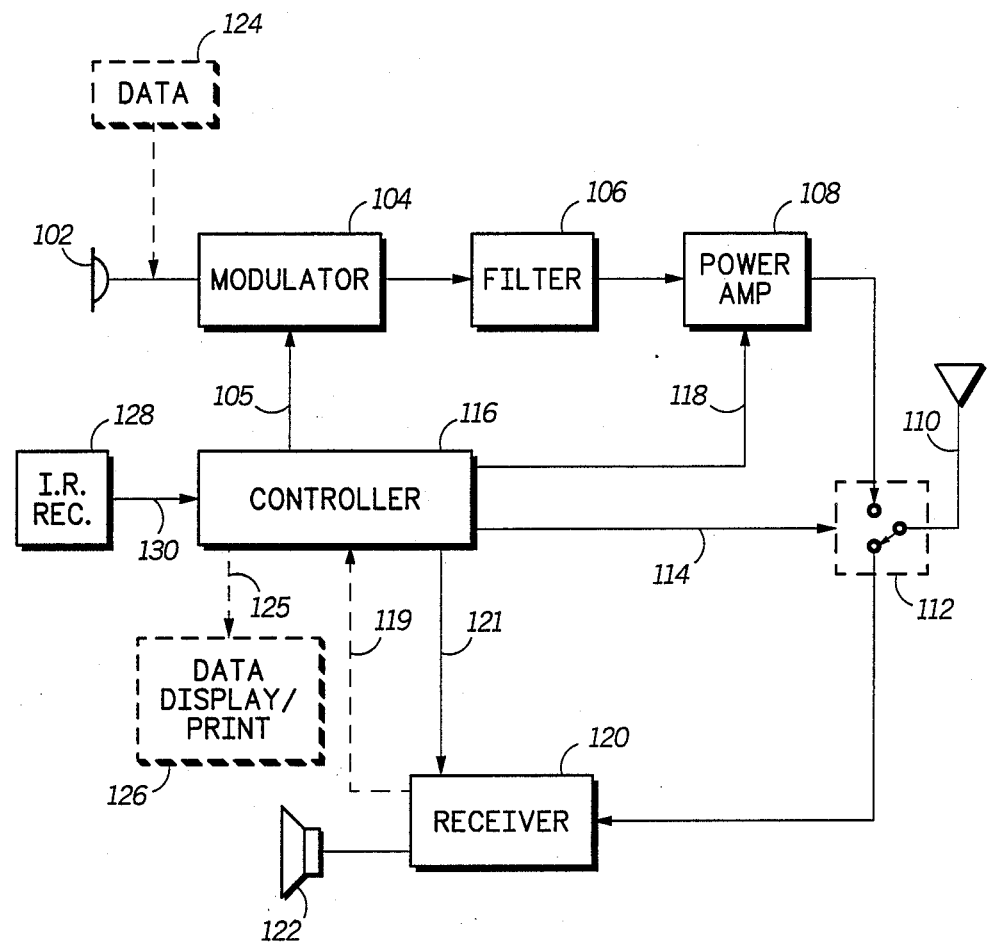
FIG. 1 is a block diagram of a radio transceiver in accordance with the present invention.

Referring to FIG. 1, a block diagram of a transceiver 100 in accordance with the present invention is shown. Operationally, speech energy impressed upon a microphone 102 is applied to a modulator 104, which may be any suitable modulator, such as, for example, a frequency synthesized modulator of conventional design. The modulated signal is applied to a filter 106, which appropriately band-limits the modulated signal before application to a power amplifier 108. The power amplifier 108 is coupled to an antenna 110 via an antenna switch 112, which is controlled (via line 114) by a controller 116. The controller 116 comprises the heart of the transceiver 100 and controls the various elements of the transceiver including the modulator (via control line 105), the power amplifier 108 (via control line 118), the antenna switch 112 (via control line 114), and a receiver 120 (via control line 121). Preferably, the controller comprises an MC68HC11, manufactured by Motorola, Inc., or its functional equivalent.

The receiver 120 receives radio frequency signals from the antenna 110 via the antenna switch 112, and provides demodulated audio to a speaker 122 for reception by an operator of the transceiver 100. Optionally, the transceiver 100 may transmit data information by coupling a data source 124 to the modulator 104. Received data messages are preferably routed to the controller (via data line 119) for processing, after which the data may be provided (via data line 125) to an operator via a data display (or printer) 126.

The transceiver 100 also includes a secondary (or control) receiver, such as an infra-red receiver (128), which forwards information (via data line 130) to the controller 116. According to the invention, this information is decoded by the controller 116 and is used to determine when the transceiver 100 is operating in a low power (or "On-Site") system or in a higher power (or "Off-Site") system. After making the system/site determination, the controller 116 may adjust the output power of the power amplifier 108 via the control line 118. Optionally, other operational parameters of the transceiver 100 may be adjusted. For example, the identification codes used by the transceiver 100 in the "On-Site" and "Off-Site" systems may change; the communication frequencies used may be varied (via control lines 105, 118, and 121) from system to system; and, receiver parameters may be altered (via control line 121) to allow the transceiver 100 to more efficiently operate within both the "On-Site" and "Off-Site" systems. Alternately, the infra-red receiver 128 may be replaced with an ultra-sonic transducer, an RF receiver, electromagnetic detector, radiation detector, or functional equivalents thereof. However, infra-red transmission is preferred by the present invention since information transmitted via infra-red will not interfere with existing RF systems, and because infra-red radiation (i.e., the transmission illumination) is limited to the room (or area) in which it is generated. The reason for this latter limitation arises from the fact that the depth of penetration of an electromagnetic signal is inversely proportional to the square root of the transmission frequency. Therefore, optical signals cannot pass through most objects (i.e., walls or other obstructions), while radio frequency signals can.

Figure 2A:
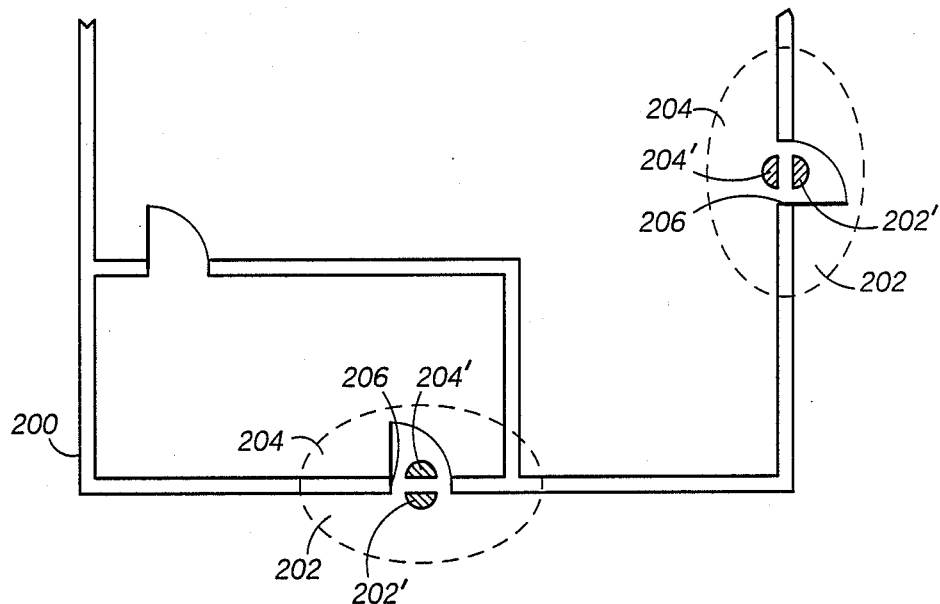
FIG. 2a and 2b are illustrations of a portion of a building arranged to facilitate operation of the present invention.
Figure 2B:
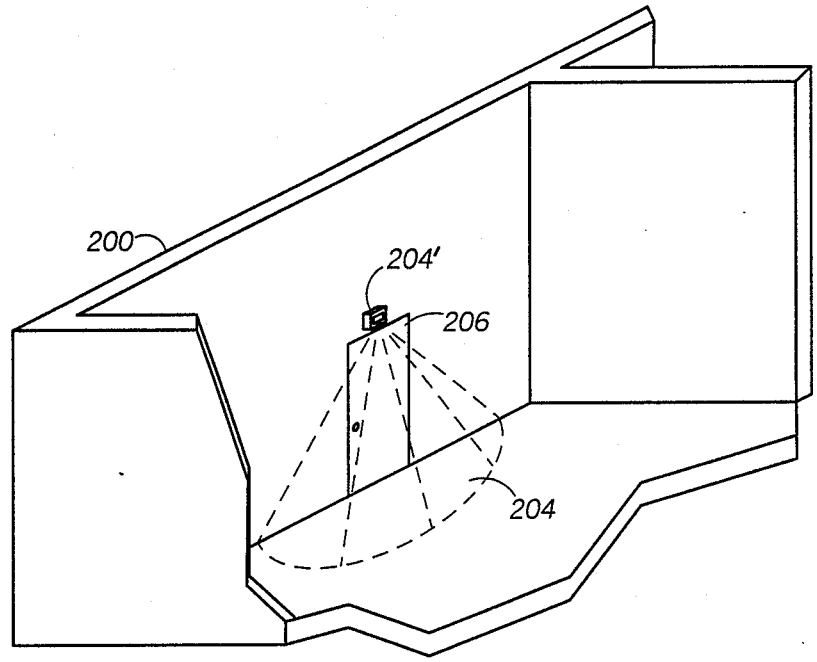

Operationally, the present invention contemplates that the transceiver 100 receives (128) a first and second code. By determining the order in which these codes were received, the transceiver 100 may determine whether it has progressed from an "On-Site" system to an "Off-Site" system (or vice versa). Accordingly, FIGS. 2a and 2b illustrate a portion of a building 200 having an "On-Site" system installed within the building. According to the invention, each exterior door (or passageway) 206 is surrounded by an exterior zone 202 and an interior zone 204. Each of these zones preferably represents the infra-red illumination range of an infra-red transmitter (202' and 204') that continuously transmits the first and second code respectively. Therefore, when the transceiver 100 of the present invention progresses through the door (or passageway) 206, it must initially receive either the first code or the second code depending upon whether the transceiver operator is headed into or out of the building. Receipt of these two codes causes the transceiver 100 to adjust its transmitter power up or down accoding to the requirements of the "On-Site" or "Off-Site" system. In this way, the transceiver 100 passing first through zone 204 and then zone 202 would adapt from the low power ("On-Site") mode to the higher power requirements of the "Off-Site" system. Conversely, the transceiver 100 first receiving the code of zone 202 followed by the code of zone 204 would adapt from the higher power ("Off-Site") mode to the lower power ("On-site") mode.

Figure 3:
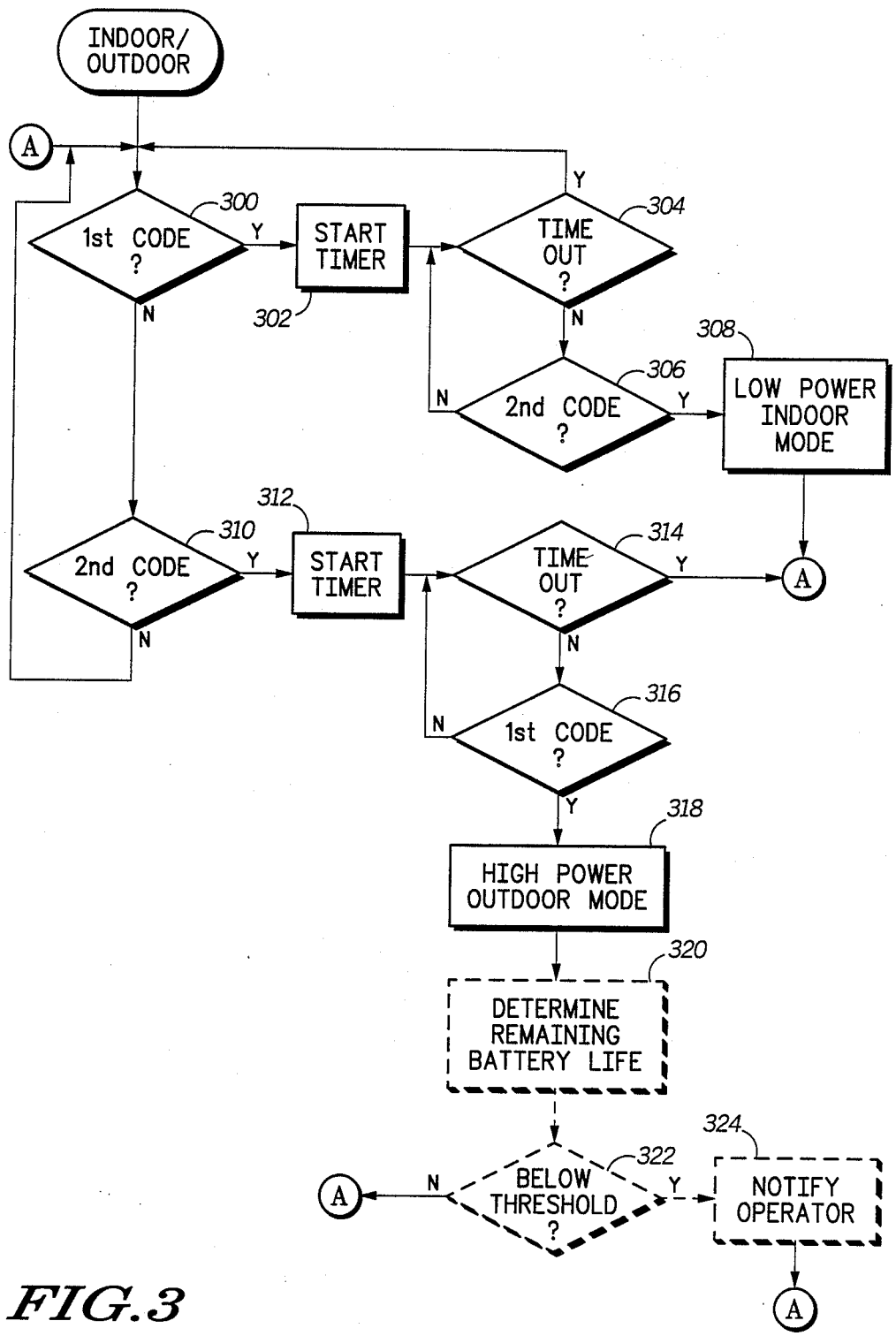
FIG. 3 is a flow diagram of the operation of the transceiver of FIG. 1 in accordance with the present invention.

Referring to FIG. 3, a flow diagram illustrating the steps executed by the transceiver 100 is shown. According to the invention, the routine begins with decision 300, which determines whether a first code has been received (preferably by either infrared or ultrasonic transducer mechanisms). If the determination of decision 300 is that the first code has been received, a timer is started (step 302) within the transceiver controller 116. Accordingly, decision 304 determines whether this timer has expired. If so, the routine returns to decision 300. However, if the determination of decision 304 is that the timer has not expired, the routine proceeds to decision 306, which determines whether a second code has been received. If not, the routine returns to decision 304 so that the transceiver 100 may determine whether the second code has been received with a pre-determined time interval. Failure of the transceiver to receive the second code within this time interval would cause the decision 304 to return control to reference letter A an begin the routine again at decision 300. However, if the determination of decision 306 is that the second code has been received, the routine proceeds to step 308, which adapts the transceiver 100 to the low power or indoor mode for use in the "On-Site" system. Optionally, other parameters may be adapted when changing from the "Off-Site" to "On-Site" mode. For example, identification codes used in the "On-Site" and "Off-Site" systems may vary; the communication frequencies used may vary; signalling, audio level, or control information may be varied or accomplished on other channels or by variations in protocol. After adjusting any or all of these parameters, the routine exits step 308 and returns to reference letter A.

Assuming that the determination of decision 300 is that the first code was not received, the routine proceeds to decision 310, which determines whether the second code was received. If so, a timer is started (step 312) and the routine proceeds to decision 314, which determines if the timer has expired. If not, the routine proceeds to step 316, which operates in conjunction with decision 314 to determine whether the first code follows the second code wtihin a pre-determined time interval. If not, control is returned to reference letter A. If, however, the first code has been properly received following receipt of the second code, the routine proceeds to step 318, which adapts the transceiver 100 from the low power or indoor mode to the higher power or outdoor mode for operation in the "Off-Site" system. Of course, other operational parameters may be adapted, such as, for example, identification code, communication frequencies, signalling, audio level, or control protocols may be varied. More particularly, the transceiver 100 may optionally determine the remaining battery life of the portable transceiver's battery in step 320. Following this, decision 322 determines whether the remaining battery life is below a predetermined threshold. If not, the routine proceeds to reference letter A and the transceiver operator may communicate in the "Off-Site" system normally. However, if the determination of decision 322 is that the remaining battery capacity is below the threshold, the operator may be notified, such as by an audible tone or a message on the display (126) that the remaining battery capacity is limited in the high power mode. Thus, although the transceiver 100 may have been able to operate for an extended period of time in the low power mode, the operator is notified that the operational life in the high power mode is limited. Thus, the operator is afforded an opportunity to obtain additional or replacement batteries to enable "Off-Site" operation for a longer time interval than would otherwise be possible. Finally, after so notifying the operator, the routine proceeds to reference letter A.

Figure 4A:
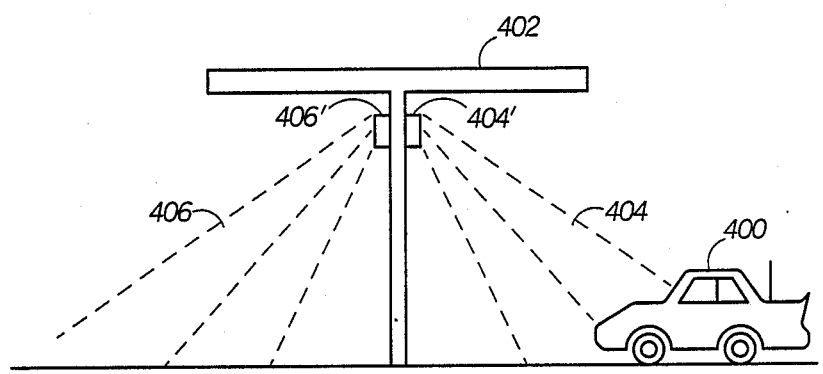
FIGS. 4a and 4b are illustrations of a the present invention applied to mobile transceivers operable over a geographic area.
Figure 4B:
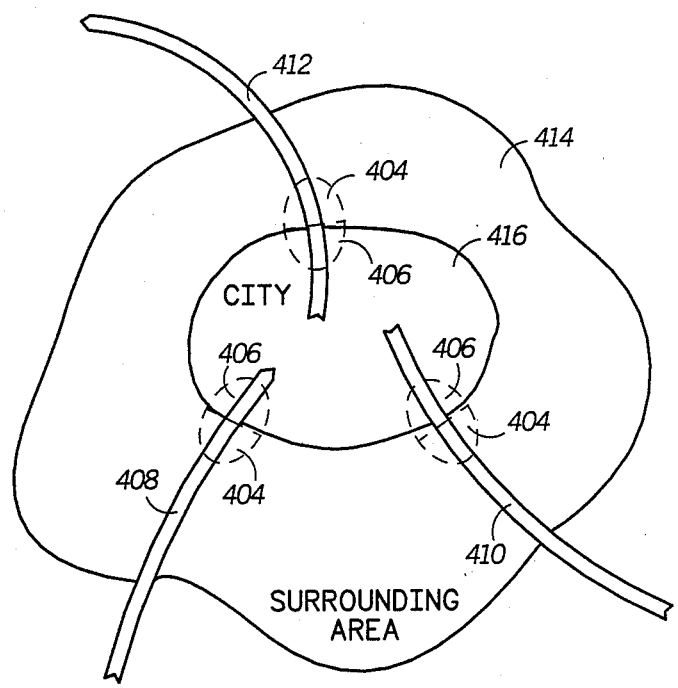

Referring to FIGS. 4a and 4b, the present invention is shown applied in a mobile transceiver context. Preferably, a mobile radio is installed in a vehicle 400, and may adapt its power by passing through pre-determined areas (404 and 406). Each area represents a transmitter's illumination pattern or acoustical or radio frequency range in which an appropriate first and second code are transmitted. In the mobile transceiver embodiment, the present invention preferably utilizes a radio frequency receiver as opposed to the infra-red receiver 128, which is preferred for the portable embodiment. Alternately, ultra-sonic transducers may be used since they have superior outdoor transmission range when compared to the outdoor illumination range of infra-red transmitters.

According to the invention, a small paging receiver (or its functional equivalent) may be used to simplify the mobile implementation while minimizing increased physical size. Accordingly, the transmitters 404' and 406' compromise radio frequency transmitters having directional antennas to properly delineate the areas 404 and 406. To properly cover the areas 404 and 406, the transmitters 404' and 406' are preferably mounted on sign posts, at tunnel entrances, or at a toll booth 402, which are located along highways or streets (408, 410, and 412) progressing into a city area 416 from a surrounding area 414. Thus, a city or urban area may be provided with a plurality of repeaters to repeat the lower power signal transmitted by the mobile radio thereby avoiding multi-path interference, fading problems or adjacent channel interference that are commonly experienced in urban areas. After leaving the city area 416 and entering the surrounding area 414, the vehicle 400 would pass through area 406 and area 404 thereby adapting to a higher power mode in the surrounding area. In this way, the mobile transceiver may transmit to a more centralized antenna illuminating the surrounding area.

Operationally, the mobile transceiver performs in a manner very similar to the portable radio described in conjunction with FIG. 3 with the exception that the optional battery life information is not required or used by the mobile transceiver. Thus, the present invention operates to adapt a transceiver from a higher power mode to a lower power mode (and vice versa), and additionally may vary other parameters, which may be used to adapt the transceiver for operation in different radio frequency communication systems, or adapt to operate within the same communication system albeit at varying power levels.

What is claimed is:

1. A method for adjusting the output power of a transmitting device, comprising the steps of:
   (a) receiving a first code when located in a first code reception area;
   (b) moving into a second code reception area to receive a second code; and,
   (c) modifying the output power of the transmitting device in response to receiving said first code and said second code.

2. The method of claim 1, wherein step (b) comprises receiving said second code within a predetermined time interval after receiving said first code.

3. The method of claim 1, wherein step (c) comprises adjusting the output power of the transmitting device from a first level to a second level, said second level being less than said first level.

4. The method of claim 1, wherein step (c) comprises adjusting the output power of the transmitting device from a first level to a second level, said second level being greater than said first level.

5. The method of claim 4, which includes the steps of:
   (d) determining a value representing remaining battery capacity;
   (e) comparing said value to a threshold; and,
   (f) asserting a signal when said value is at least less than said threshold.

6. The method of claim 1, which includes the steps of:
   (d) receiving said second code while operating in the second code reception area;
   (e) receiving said first code while operating in the first code reception area; and,
   (f) modifying the output power of the transmitting device in response to receiving said first code and said second code.

7. A method of adjusting the output power of a transmitting device, comprising the steps of:
   (a) receiving a first and a second code in sequence and within a predetermined time interval while moving from a first code reception area to a second code reception area; and,
   (b) adjusting the output power of the transmitting device in response to step (a).

8. The method of claim 7, wherein step (b) comprises adjusting the output power of the transmitting device from a first level to a second level, said second level being less than said first level.

9. The method of claim 7, wherein step (b) comprises adjusting the output power of the transmitting device from a first level to a second level, said second level being greater than said first level.

10. The method of claim 9, which includes the steps of:
    (c) determining a value representing remaining battery capacity;
    (d) comparing said value to a theshold; and,
    (e) asserting a signal when said value is at least less than said threshold.

11. A method of adjusting the output power of a transmitting device capable of operating in a high power communication system and a low power communication system, said low power communication system including a plurality of infra-red transmitters each of which transmit a first code or a second code within a respective first and second code reception area of said low power communication system, said method comprising the transmitting device steps of:
    (a) receiving, respectively, said first code and said second code while operating in the first and second code reception areas;
    (b) determining which of said first code and said second code was initially received; and,
    (c) reducing the output power of the transmitting device when said first code was initially received and increasing the output power of the transmitting device when said second code was initially received.

12. The method of claim 11, which includes the steps of:
    (d) determining a value representing remaining battery capacity;
    (e) comparing said value to a threshold; and,
    (f) asserting a signal when said value is at least less than said threshold.

13. A transmitting device capable of adjusting output power, comprising:
    means for receiving a first code when operating in a first code reception area and a second code when operating in a second code reception area to respectively provide a first received code and a second received code;
    means for determining whether said first received code or said second received code was initially received; and,
    means for modifying the output power of the transmitting device in response to said determining means.

14. The device of claim 13, wherein said means for modifying comprises means for increasing the output power of the transmitting device when said first received code was initially received, and for reducing the output power of the transmitting device when said second received code was initially received.

15. The device of claim 13, which includes:
    means for determining a value representing remaining battery capacity;
    means for comparing said value to a threshold; and,
    means for asserting a signal when said value is at least equal to said threshold.

16. The device of claim 13, wherein said means for receiving said first code and said second code comprises an infra-red receiver.

17. A method for automatically adjusting the output power of a transmitting device capable of operating in a high power and a low power communication system, comprising the steps of:

at the low power communication system:
- (a) transmitting a first code in a first area;
- (b) transmitting a second code in a second area;

at the transmitting device:
- (a) receiving said first code when operating in the first area and said second code when operating in the second area;
- (b) determining which of said first code and said second code was initially received; and,
- (c) increasing the output power of the transmitting device to facilitate operation in the high power communication system when said first code was initially received, and reducing the output power of the transmitting device to facilitate operation in the low power communication system when said second code was initially received.

18. The method of claim 17, which includes the transmitting device steps of:
- (d) determining a value representing remaining battery capacity;
- (e) comparing said value to a threshold; and,
- (f) asserting a signal when said value is at least less than said threshold.

* * * * *